Oct. 17, 1967     R. L. SCOTT     3,347,023
VACUUM DEAERATOR
Filed Oct. 24, 1965
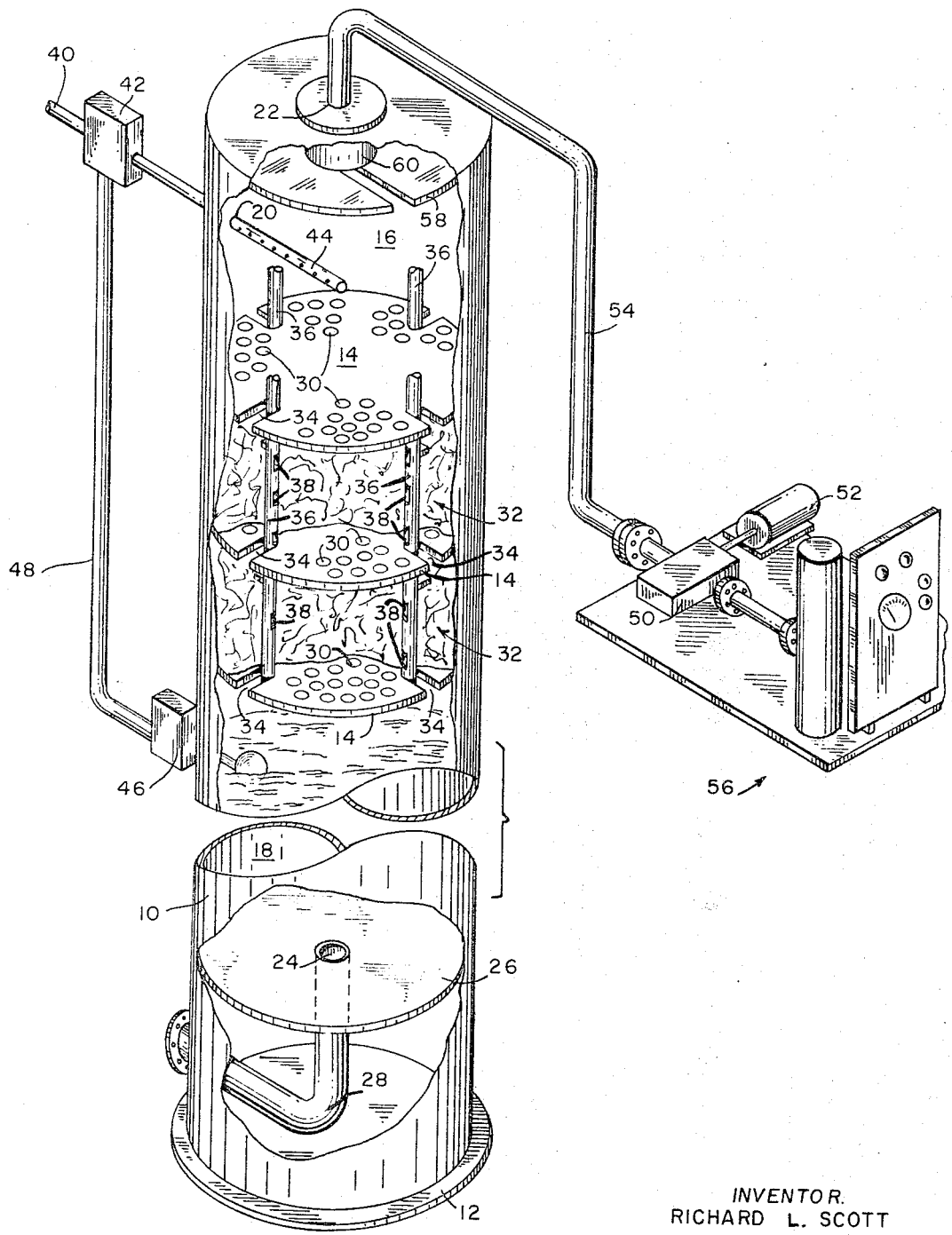
INVENTOR.
RICHARD L. SCOTT
BY
ATTORNEYS

3,347,023
VACUUM DEAERATOR
Richard L. Scott, Tulsa, Okla., assignor to
Forrest L. Murdock, Tulsa, Okla.
Filed Oct. 24, 1965, Ser. No. 504,805
2 Claims. (Cl. 55—193)

This invention relates to a deaerator. In a broader sense the invention relates to equipment for the extraction of entrained gases from liquids such as air from water. Most particularly, the invention relates to equipment for the extraction of gases, including oxygen, carbon dioxide, air, etc., from water as a means of reducing the corrosiveness of the water.

Corrosiveness of water is nearly always deleterious and in some industrial applications water corrosiveness is highly critical. For instance, in the secondary recovery of crude oil as practiced in the oil industry today wherein large quantities of water are injected into the earth, corrosiveness of the water is extremely harmful and must be reduced as much as is practically possible. If corrosiveness is not reduced, metal oxides, in the form of rust, etc., are produced in the pipes and equipment carrying and pumping water, and are carried into the earth formations into which water is injected. Not only is the piping and equipment ultimately destroyed by the corrosiveness, but the rust and other oxides may soon block the porous earth formations preventing the further injection of water into the formations and thereby terminating, or at least impairing the secondary recovery operation.

Corrosiveness of water used in boiler applications can cause substantial damage and deterioration of any metallic equipment into which it comes in contact. For these reasons nearly all water used for water flood, boiler feed and other industrial applications must be treated in some way to reduce the free oxygen content. By free oxygen content is meant the oxygen contained or entrained in water, either as oxygen gas alone or as a component of air entrained in the water and is distinguished from the oxygen atoms forming the molecular water itself. It is well known that all water contains a substantial amount of dissolved and entrained oxygen. It is upon this dissolved and entrained oxygen that most fish and other marine life survive. While useful in its normal occurrence entrained oxygen is highly deleterious in industrial water application. To alleviate the corrosive effect of the dissolved or entrained oxygen, the water is treated, usually by means of chemicals, to cause a reaction with the entrained oxygen to produce a non-corrosive oxide or other inert compound. Treating water chemically, while completely successful, is expensive, particularly if the oxygen content of the water being treated is high. This invention provides a means of substantially reducing the oxygen content of water so that chemical treatment is eliminated or at least the extent and cost thereof is substantially reduced.

It is therefore an object of this invention to provide a water deaerator. More particularly, it is an object of this invention to provide a water deaerator providing means of inexpensively extracting entrained oxygen from water. Another, and particular object of this invention, is to provide a water deaerator in which water having entrained oxygen, air, carbon dioxide or any other gas, is subjected to a vacuum wherein a high percentage of such entrained gases is extracted therefrom.

Still more particularly, an object of this invention is to provide a water deaerator including improved means of subjecting water to a vacuum for the extraction of the entrained air, oxygen, and other gases therefrom.

These objects will be fulfilled by the apparatus to be now described taken in conjunction with the attached drawing which discloses the water deaerator of this invention in isometric view and partially cut away to disclose the interior thereof, the drawing further showing the accessory equipment forming a part of the total deaerating apparatus.

This invention may be described as a water deaerator. More particularly, but not by way of limitation, the invention may be described as a water deaerator consisting of an upstanding closed vessel having a water outlet at the bottom, a water inlet and an air outlet near the top, the vessel having two or more spaced horizontal perforated distribution pans supported between the interior top and the bottom, the area above the distribution pans forming a water inlet area and the area below the distribution pans forming a water storage area, the area between the pans being filled with diffusing packing to form percolation areas within the vessel so that water entering the vessel trickles downward through the percolation areas, and including means of applying vacuum to the vessel at the inlet opening so that the water is diffused in the percolation area and as it trickles downward is subjected to a vacuum in a manner such that a substantial portion of any entrained oxygen, air or other gases is extracted from the water.

Referring now to the drawing, the deaerator of this invention consists basically of a closed upright vessel 10 supported on its base 12. Intermediate the top and bottom of vessel 10 are horizontal perforated spaced apart distribution pans 14 which divide the interior of the vessel into an upper water inlet area 16 and a lower water storage area 18. The vessel 10 has a water inlet opening 20 in a water inlet area 16 and an air outlet opening 22 likewise communicating with the water inlet area 16. A water outlet opening 24 is provided in the bottom of the vessel by which water is drawn out of the storage area 18. In the illustrated embodiment the vessel 10 is provided with a bottom partition 26 which contains the water outlet opening 24, the water being conducted through a pipe 28 to the exterior of the vessel.

Distribution pans 14 are provided with perforations 30 so that water entering the vessel is evenly distributed through the cross-sectional area of the vessel and flows downwardly towards the water storage area 18.

The areas between the distribution pans 14 are filled with diffusing packing 32. The purpose of which is to cause the water flowing downwardly therethrough to be dispersed and diffused so that the surface area of the water droplets trickling through the packing is greatly amplified.

The distribution pans 14 are provided with openings 34 which receive equalizing pipes 36. Each of the equalizing pipes 36 communicates the water storage area 18 with the water inlet area 16. Each of the pipes is provided with openings 38 between the distribution pans 14. The function of the equalizing pipes 36 is to provide communication with all areas of the vessel to equalize the pressure throughout the vessel.

Water to be deaerated flows from pipe 40, through a control valve 42 and through opening 20 into the interior of the vessel, the inlet water being distributed by a distribution pipe 44. The level of water in the water storage area 18 is detected by a liquid level controller 46, such as a float switch or the like, which by coupling means 48 is connected to control valve 42. As the water in storage area 18 reaches the preselected maximum level the liquid level control 46 actuates to close the control valve 42, stopping the flow into the vessel.

Vacuum is applied to the interior of the vessel from a vacuum pump 50, driven by motor 52, the vacuum pump being connected with the vessel by means of pipe 54. Vacuum controls 56 may be utilized in conjunction with a pressure detector (not shown) positioned within the vessel whereby the level of vacuum in the vessel may be controlled.

Splash baffles 58 provided in the upper end of the vessel prevent water being splashed into the outlet opening 22. A mist extractor 60 is placed over the air outlet opening 22 to extract water from the gas being withdrawn from the vessel.

Operation

Water to be deaerated flows from pipe 40 through control valve 42 and into the vessel 10. The water is spread by distribution pipe 44 and falls downwardly onto the uppermost pan 14. The water spreads out over the pan and passes downwardly through perforations 30 and through the packing 32. The packing, as previously described, serves to diffuse the water and cause the surface area of the water to be greatly increased as it trickles downwardly. The water ultimately passes downwardly through all the packing 32, past the lowermost distribution pans 14 and falls into the water storage area 18.

Vacuum is applied to the interior of the vessel by means of pump 50. To insure even pressure distribution in the vessel so that the water in various areas of the vessel will be subjected equally to the vacuum, and to prevent pressure differential within the vessel, pipes 36, having openings 38 therein, communicate all areas of the vessel with each other. Four of such pipes 36 are shown, although any number of one or more may be utilized. In like manner, while three distribution pans 14 with two areas for packing 32 therebetween are shown, any arrangement utilizing two or more such distribution pans is within the scope of the invention.

The water being subjected to the vacuum within the vessel relinquishes a great percentage of any entrained gas. Such gas normally includes primarily air, oxygen, and carbon dioxide, but may include other gases entrained according to the source of the water.

In most installations, a vacuum of 25 to 27 inches of mercury is desired. The device can be operated so that the vacuum pump 50 is continuously energized or control means may be provided to de-energize the motor 52 when the vacuum reaches a pre-selected point and automatically re-energizing the motor when the vacuum falls below a pre-selected point.

While the invention has been described with reference to its use to deaerate water, the invention may obviously be used to extract gas from any fluid. The word air is used generally to include any gas entrained in a fluid capable of being extracted therefrom by vacuum.

The invention has been described in more or less specific detail, however, it is understood that many changes may be made in the design which would depart from the illustrated embodiment but which would not depart from the scope of the invention set forth in the appended claims.

What is claimed:
1. A deaerator for removing entrained gases from liquids comprising:
   an upstanding vessel;
   a multiplicity of spaced apart substantially horizontal and paralleled perforated distribution pans supported within said vessel and intermediate the top and bottom thereof, said distribution pans forming percolation areas therebetween, said percolation areas dividing said vessel into an upper fluid inlet portion and a lower fluid storage portion, said vessel having a fluid inlet and a gas outlet opening therein in said upper fluid inlet portion and a fluid outlet in said fluid storage portion, each of said pans having conduit receiving openings therein;
   diffusing packing filling said percolation areas through which fluid entering said vessel trickles downwardly therethrough;
   a vacuum pump means communicating with said vessel gas outlet opening for imparting a vacuum to the interior of said vessel and extracting gas therefrom; and
   a multiplicity of spaced apart pressure equalizing conduits within said vessel communicating said lower fluid storage area with said upper fluid inlet area, said conduits received by said pan conduit receiving openings, and said conduits having openings therein communicating with each of said percolation areas, said conduits serving to equalize the pressure within all areas of said vessel and provide paths for the flow of gas extracted from liquid within the vessel.

2. A deaerator according to claim 1 including means responsive to the fluid level in said storage area of controlling fluid inlet into said vessel.

References Cited

UNITED STATES PATENTS

| 1,433,965 | 10/1922 | Mills | 55—165 |
| 2,614,649 | 10/1952 | Walker et al. | 55—175 X |
| 2,765,917 | 10/1956 | Francis | 55—175 X |
| 2,939,544 | 6/1960 | Walker et al. | 55—175 X |

REUBEN FRIEDMAN, *Primary Examiner.*

R. W. BURKS, *Assistant Examiner.*